United States Patent [19]

Cadotte

[11] 4,259,183

[45] Mar. 31, 1981

[54] REVERSE OSMOSIS MEMBRANE

[75] Inventor: John E. Cadotte, Minnetonka, Minn.

[73] Assignee: Midwest Research Institute, Kansas City, Mo.

[21] Appl. No.: 2,396

[22] Filed: Jan. 10, 1979

Related U.S. Application Data

[63] Continuation-in-part of Ser. No. 958,593, Nov. 7, 1978.

[51] Int. Cl.³ .................. B01D 13/00; C08G 69/42; C08C 19/20
[52] U.S. Cl. .................. 210/654; 210/500.2; 528/337; 264/45.1; 427/246; 525/344
[58] Field of Search ........ 210/23 H, 500 M, 490–491; 528/337; 526/31, 46; 264/45.1, 41; 427/244–246; 428/417, 420, 309

[56] References Cited

U.S. PATENT DOCUMENTS

| | | | |
|---|---|---|---|
| 3,551,244 | 4/1968 | Forester et al. | 156/246 |
| 3,567,632 | 3/1971 | Richter et al. | 210/23 |
| 3,600,350 | 8/1971 | Kwolek | 210/326 |
| 3,687,842 | 8/1972 | Credali et al. | 210/23 |
| 3,696,031 | 10/1972 | Credali et al. | 210/23 |
| 3,699,038 | 11/1972 | Boom | 210/23 |
| 3,744,642 | 7/1973 | Scala et al. | 210/500 M |
| 3,878,109 | 4/1975 | Ikeda et al. | 210/500 M |
| 3,904,519 | 9/1975 | McKinney, Jr. et al. | 210/23 |
| 3,926,798 | 12/1975 | Cadotte | 210/23 |
| 3,948,823 | 4/1976 | Lee et al. | 210/500 M |
| 3,951,789 | 4/1976 | Lee et al. | 210/22 |
| 3,951,815 | 4/1976 | Wiasidlo | 210/500 M |
| 3,993,625 | 11/1976 | Kurihara et al. | 210/500 M |
| 4,005,012 | 1/1977 | Wrasidlo | 210/23 H |
| 4,020,142 | 4/1977 | Davis et al. | 264/347 |
| 4,039,440 | 8/1977 | Cadotte | 210/23 H |

OTHER PUBLICATIONS

"Polyamide Membranes" by P. Blais Ch. 9 *Reverse osmosis and Synthetic Membrane* by S. Souririjan NRSg Can. pp. 167–210 (1977) NTI Report PB 253 193/76A (Abstract, Table of Content, List of Tables and pp. 16–20.

*Primary Examiner*—Charles N. Hart
*Assistant Examiner*—E. Rollins Cross
*Attorney, Agent, or Firm*—Merchant, Gould, Smith, Edell, Welter & Schmidt

[57] ABSTRACT

A composite permselective membrane is prepared by reaction of a film or layer containing cycloaliphatic polyfunctional secondary amines with a triacyl halide or its mixture with a diacyl halide. The membrane is useful in separating components of fluid mixtures or solutions, such as the removal of salts from aqueous solutions by reverse osmosis.

17 Claims, No Drawings

REVERSE OSMOSIS MEMBRANE

This application is a continuation-in-part of my co-pending application Ser. No. 958,593, filed Nov. 7, 1978.

TECHNICAL FIELD

This invention relates to permselective barriers in the form of thin film composite membranes for the selective separation of fluid mixtures and solutions. An aspect of this invention relates to polyamides (preferably ultrathin polyamides on porous supports) suitable for reverse osmosis desalination of aqueous solutions containing dissolved solutes, to the process for preparing these membrane compositions, and to the process for using such membranes.

BACKGROUND OF THE PRIOR ART

Reverse osmosis membranes have been prepared from a wide variety of known or preformed polymeric materials. In preparation of such membranes the polymer is typically dissolved in a suitable solvent, cast in the form of films or fibers, and quenched in water to form asymmetric membranes. These membranes include numerous polyamide and polyimide-type membranes that show utility in reverse osmosis desalination processes. In the book Reverse Osmosis and Synthetic Membranes, National Research Council of Canada, 1977, by S. Sourirajan, Chapter 9 by P. Blais presents an extensive list of polyamide membranes, including their fabrication and properties. These polyamide membranes are additionally described in U.S. Pat. Nos. 3,567,632, 3,600,350, 3,687,842, 3,696,031, 3,878,109, 3,904,519, 3,948,823, 3,951,789, and 3,993,625. These polyamide membranes are presently understood to be substantially linear polymers synthesized in a prior operation, then cast or extruded into permselective membranes by solvent processes. Polyamide membranes made in this manner appear to exhibit rather low fluxes to water in reverse osmosis desalination processes, as listed in Table 2 of the above-cited book, such that these polyamide membranes have found practical use only in the form of hollow fine fibers as according to the description in U.S. Pat. No. 3,567,632.

In addition, polyamide composite membranes, suitable for use in reverse osmosis desalination processes, have been prepared by condensation reactions in situ on a preformed support film. Examples of such membranes, and their preparation, are described in U.S. Pat. Nos. 3,744,642, 3,951,815, 4,005,012 and 4,039,440. For an example of an acid-catalyzed, in situ polymerization on the support, see U.S. Pat. No. 3,926,798. For an example of the crosslinking of a preformed semi-permeable polybenzimidazole membrane, see U.S. Pat. No. 4,020,142. Permselective membranes made by this thin film composite approach have, in some cases, exhibited greatly improved fluxes relative to preformed polyamides subsequently cast or extruded into membrane form by solvent processes. The aforementioned U.S. Pat. No. 3,744,642 contains a detailed description of desalination membranes prepared by interfacial condensation reactions.

However, the membranes of the prior art, whether prepared from preformed polymers or by in situ reactions, have oftentimes exhibited one or more other deficiencies such as low salt rejection, low durability or resistance to compression, sensitivity to extremes of pH or temperature, and lack of resistance to microbial attack or oxidation by chlorine in the feed water. Lack of resistance to chlorine in the feed water is a particularly noteworthy deficiency in permselective polyamide membranes. According to U.S. Pat. No. 3,951,815, the site of attack by chlorine on polyamide membranes is the amidic hydrogen atom present in the —CO—NH— group. In compositions such as the polypiperazineamides described in U.S. Pat. Nos. 3,687,842, 3,696,031, and 3,951,815, resistance to chlorine in feed waters appears to have been adequately demonstrated; however, such resistance to attack by chlorine is believed to be atypical.

It would appear that permselective polyamide membranes could be obtained by condensation polymerization of diacyl halides with secondary diamines. Theoretically, the resulting polymeric products would be devoid of amidic hydrogen and would therefore be expected to be insensitive to chlorine in the feed water. Representative polyamides such as this have been prepared from piperazine and its derivatives as described in U.S. Pat. Nos. 3,687,842 and 3,696,031 and NTIS Rept. No. PB253 193/7GA.

These compositions exhibited permeate fluxes of 2.4 to 650 liters per square meter per day ($1/m^2$-day) at a pressure of 80 atmospheres toward saline feed solutions containing 5,000 to 10,000 ppm sodium chloride. These fluxes are generally uneconomical for use in reverse osmosis desalination processes (except in the form of hollow fine fibers).

Currently, process economics indicate a need for membrane fluxes of 600 to 800 $1/m^2$-day at pressures of 55 to 70 atmospheres for seawater feed (35,000 to 42,000 ppm total dissolved salts). For brackish waters containing 3,000 to 10,000 ppm salts, economically attractive membranes must provide permeate fluxes of 600 to 800 $1/m^2$-day at pressures of only 25 to 40 atmospheres. While specific reverse osmosis applications for permselective membranes may deviate from these requirements, such membranes will not achieve broad commercial applicability unless they meet these criteria. A need therefore remains for permselective polyamide membranes which combine the properties of chlorine resistance and high flux as well as the other properties mentioned above.

SUMMARY OF THE INVENTION

It has now been discovered that excellent permselective membranes combining high fluxes with chlorine resistance and low salt passage can be prepared by the interfacial condensation of polyfunctional secondary amines with polyfunctional acid halides having an acid halide functionality greater than 2. It has further been found that mixtures of triacyl halides with diacyl halides may provide synergistic, unexplained flux-enhancing effects on the permselective membranes in this invention. It has also been discovered that superior salt rejection properties can be achieved in the permselective membranes of this invention by forming amide prepolymers of the polyfunctional secondary amines, subsequently employing these prepolymers in the interfacial preparation of the membrane barrier layer.

In a preferred embodiment of this invention, the permselective or reverse osmosis membrane is a composite comprising a microporous substrate and an "ultrathin" film having semipermeable properties deposited on one surface of said microporous substrate, the ultrathin film being formed by contacting an aqueous solution of a chemical or chemicals containing a multiplicity of secondary amine functional groups with vapors or a solution of an aromatic trifunctional (or higher) acid halide alone or in combination with diacyl halides.

The preferred method for preparing a composite permselective membrane comprises the steps of (a) treating a microporous substrate with an aqueous solution of the secondary amine, (b) contacting the resultant coated microporous substrate with the polyfunctional acid halide (preferably dissolved in a nonpolar organic liquid solvent), whereby both crosslinking and chain-extending amide-forming condensation reactions can occur on the surface of said microporous substrate, and (c) drying said composite permselective membrane at ambient or elevated temperatures.

Alternatively, the ultrathin film can be formed by contacting an aqueous solution of an amide prepolymer containing a multiplicity of secondary amine functional groups with a polyfunctional acid halide, said prepolymer having been formed in a prior reaction of an excess over stoichiometry of secondary diamine with a trifunctional acid chloride.

Particularly good results are obtained with a thin film composite permselective membrane which comprises a microporous substrate (e.g. a conventional polysulfone support) and a thin film having semi-permeable properties deposited on one surface of the support, the thin film having been formed by contacting an aqueous solution of aliphatic heterocyclic polyfunctional secondary amine (e.g. piperazine or substituted piperazine) with a relatively nonpolar solution of an aromatic tricarboxylic acid halide alone or mixed with an aromatic dicarboxylic acid halide, the solution of polyfunctional acyl halides being capable of reacting with the polyfunctional secondary amine to deposit the resulting thin film on the support or substrate.

DEFINITIONS

Throughout this specification, the following terms have the indicated meanings.

"Essentially monomeric" refers to a chemical compound capable of chain extension and/or cross-linking and/or other polymerization reactions, which compound is relatively low in molecular weight, is typically readily soluble in one or more common liquid solvents, and is generally free of repeating units linked by polyamide (—CO—NH—) linkages. However, provided that the solubility in liquid alkane (including halogenated alkane) solvents is not reduced below a fraction of a percent by weight, a very small number of repeating polyamide units (e.g. two or three) can be present and the compound can still have some "essentially monomeric" character. For example, in the case of a polyfunctional acid halide monomer, the functionality can be increased by linking two triacid halides with a difunctional chain extender (diamine, diol, etc.) to form a tetraacid halide (or three triacid halides to form a pentaacid halide, etc.).

"Essentially soluble" (e.g. "essentially water soluble") denotes a measurable solubility in the solvent which exceeds a desired level (e.g. greater than 0.01 wt.-% or, more typically, greater than 1.0 wt.-%) under ordinary conditions of temperature and pressure (e.g. 20°–25° C. and 1.0 atmosphere).

"Chain extension" refers to a type of chemical reaction, preferably intermolecular in nature, which causes the formation of a linear chain of repeating monomeric units or increases the size of a polymeric, oligomeric, or prepolymeric molecular chain in an essentially linear fashion (i.e. without necessarily increasing the crosslink density of the polymer, oligomer, or prepolymer).

"Nonpolar solvent" refers to solvents having a polarity or dipole moment which is no greater than the polarity or dipole moment of the low molecular weight, liquid, halogenated hydrocarbon solvents (e.g. dichloromethane). Accordingly, "nonpolar solvents" are considerably less polar than the typical polar solvents such as water, $C_1$–$C_3$ alkanols, ammonia, etc. and tend to be less than about 5 wt.-% soluble in water at 20° C. Typical "nonpolar solvents" incude the $C_1$–$C_{12}$ aliphatic (including halogenated aliphatic) solvents such as the alkane (including halogenated alkane) solvents having a melting point below 20° C. Non-aliphatic (e.g. aromatic) hydrocarbon solvents are less preferred. The most conveniently used solvents are the $C_1$–$C_3$ halogenated aliphatics, the $C_5$–$C_8$ alkanes, $C_5$ and $C_6$ cycloaliphatics, etc.

"Secondary amine/acid halide ratio" refers to the ratio of (a) equivalents of secondary amine to (b) equivalents of acid halide (i.e. the halide obtained when one or more —OH functions of an acid such as a carboxylic acid, cyanuric acid, or an inorganic acid such as orthophosphoric acid are replaced with halogen) in a reaction mixture. For example, in a mixture of two moles of trimesoyl chloride (the acid chloride of trimesic acid, 1,3,5-benzenetricarboxylic acid) and three moles of piperazine, the secondary amine/acid halide ratio would be 1:1 or stoichiometric, while in an equimolar mixture of these two compounds, the secondary amine/acid halide ratio would be only 2:3 or 0.67:1 or 1:1.5. A secondary amine/acid halide (e.g. NRH/COCl) ratio of 1:1 (as in an equimolar mixture of isophthaloyl chloride or teriphthaloyl chloride and piperazine) tends to favor polyamide-forming chain extension, while an NRH/COCl ratio greater than, say, 1.2:1 (e.g. 1.3:1 to 4:1), i.e. an excess over stoichiometry of the —NRH component, tends to favor the formation of secondary amine-terminated polyamide prepolymers or oligomers having relatively few repeating units linked by polyamide (—NH—CO—) linkages and having a molecular weight in the hundreds or low thousands (i.e. well below 100,000). An NRH/COCl ratio in the neighborhood of 1:1 (e.g. 0.8:1 up to 1.5:1) tends to favor both chain extension and crosslinking when the average functionality of one of the components (preferably the —COCl component) is greater than 2.0 (e.g. >2.05) and preferably about 2.1 to 3.0. The resulting molecular weight of the condensation product (the polyamide is typically well above 100,000 and has a crosslink density in excess of one per 100,000. (In prepolymer formation, it is also preferred to make use of an average acid halide functionality above 2.05, e.g. up to 3 or 4.)

The term "ultrathin" is defined in U.S. Pat. No. 3,551,244 (Forrester), issued Dec. 29, 1970 as referring to films, membranes, or layers having a thickness in the range of 0.05 to 5 microns ($\mu$M). For purposes of this invention, a 5-micron thickness would be atypical, and thicknesses below 1 micron (1,000 m$\mu$M or 10,000 Angstroms) and even below 0.5 micron (500 m$\mu$M) can provide good flux and good salt rejection. Thicknesses below 0.05 microns are difficult to achieve in practice and hence not ordinarily contemplated for ultrathin membrane technology, but, theoretically, thicknesses down to perhaps 0.01 micron deposited on a suitable porous support could impart salt rejection properties to the membrane/support composite. Optimum flux and salt rejection properties appear to be obtained in the range of 0.05–0.3 micron (50–300 mμM).

The terms "polyamide prepolymer" and "polyamide oligomer" are used more or less interchangeably to denote relatively low molecular weight polyamides (e.g. as low as about 200 or 300 and typically not more than a few thousand) having very few repeating units and/or very few amide (—NH—CO—) linkages, e.g. as low as three amide linkages per polyamide prepolymer molecule. The "polyamide prepolymers" preferred for use in this invention are secondary amine terminated, i.e., the number of terminal secondary amine residues would be generally equal to the functionality of the acid halide coreactant. For example, polyamide prepolymer derived from piperazine and trimesoyl chloride would typically have essentially three terminal piperazine residues. The number of repeating units and the molecular weight of the amine-terminated polyamide prepolymer is preferably kept low enough to insure a reasonable level of water solubility.

"Volatilizable" indicates a solid or liquid compound which can be boiled (preferably at normal atmospheric or modestly reduced pressures such as 100 mm Hg) without substantial chemical decomposition at temperatures below 1000° C., preferably below 500° C. Thus, isophthaloyl chloride, phosphorus oxychloride, trimesoyl chloride, etc. are "volatilizable".

DETAILED DESCRIPTION

It has been found, in accordance with the present invention, that composite membranes characterized by high flux, high rejection, particularly of divalent salts, and good resistance to attack by chlorine can be prepared by interfacial polymerization reaction of a layer or film of a solution of the secondary amine on a porous support with, for example, a triacyl halide or its mixture with diacyl halides, particularly as exemplified by trimesoyl chloride, i.e., 1,3,5-benzenetricarboxylic acid chloride, or a mixture of trimesoyl chloride and isophthaloyl chloride. In the conduct of this interfacial reaction, the acyl halide groups react with secondary amine groups to produce amide linkages devoid of amidic hydrogen. Reaction is instantaneous at the interface because of the exceptionally high reaction rate of acyl chlorides for amines. The three-pronged functionality of the triacyl halides leads to the generation of a highly crosslinked, three-dimensional polymeric network in the membrane. The membrane material is thus a polymer approaching infinite molecular weight (e.g. well above 100,000 molecular weight) which further is generally insoluble in virtually any solvent that does not first seriously degrade its molecular structure. However, not all of the acyl halide functional groups become bound into amide linkages. A substantial proportion of the acyl halide functional groups are hydrolyzed by water present in the amine reagent, generating carboxylic acid groups or carboxylate salts. These carboxyl groups have been discovered to exert surprising effects on the performance of the interfacial membrane, in that they enhance flux and profoundly effect the membrane's rejection of aqueous dissolved solutes.

Because of the highly crosslinked nature of these compositions, resulting in their ultrahigh molecular weight and lack of solubility, these compositions are not well suited for processing into membranes by any conventional polymer processing techniques such as film casting from solvents or melt forming. It has been found that this invention can be prepared in the form of thin film composite membranes simply and efficiently by a series of steps comprising (1) application of the amine solution to the porous support, and preferably saturation of the support with the solution, preferably followed by pressing of the support to remove excess amine solution, (2) reaction with the acid halide, and (3) drying (e.g. air drying).

The porous support may be any of the types conventionally used in reverse osmosis processes. The preferred supports, however, are those prepared from organic polymeric materials such as polysulfone, chlorinated polyvinyl chloride, polyvinyl butyral, polystyrene, cellulose esters, etc. Polysulfone film has been found to be a particularly effective support material for the membranes of the invention. Preparation of such films is described in the above-mentioned U.S. Pat. Nos. 3,926,798 and 4,039,440, the disclosures of which are incorporated herein by reference.

The molecular formula of this invention can be represented therefore by the following:

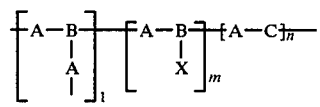

where
  A = secondary diamine dicarboxamide,
  B = trifunctional organic moiety,
  X = carboxylic acid or carboxylate salt, and
  C = difunctional organic moiety derived from a diacyl halide.

In the above structure, $l+m$ must reside in the range of 2 to 100 percent of the polymer units, and n may vary from 0 to 98% of the polymer units. In some cases, m may approach zero.

A typical embodiment of the foregoing structural formula can be prepared through interfacial reaction of the monomeric amines with triacyl halides or mixtures of diacyl and triacyl halides. Alternatively, the same chemical composition can be prepared by reaction of the amines with a triacyl halide to form an essentially water soluble, amine-terminated polyamide prepolymer or oligomer, which then is further polymerized by interfacial reaction with diacyl or triacyl halides. As will subsequently be shown in the exemplification of preferred embodiments of the invention, the properties of the membranes of this invention can be widely varied depending upon the choice of routes to the final polymer composition and the ratios of acyl halides employed.

The amine component in this invention may represent any polyfunctional secondary amine of aliphatic or cycloaliphatic origin to achieve chlorine resistance. However, to achieve high membrane flux, selection of piperazine (including piperazine derivatives) is preferred in this invention as exemplified by piperazine, 2-methylpiperazine, 2,5-dimethylpiperazine. The N,N'-dialkyl-substituted alkylene diamines and linear polyethyleneimine are less preferred secondary amines and are considered to be less effective than the aforementioned piperazines. Use of mixtures of secondary amines may be practiced under this invention, including substantial amounts of monofunctional secondary amines such as morpholine or dimethylamine, so long as the average functionality of the secondary amine mixture and the ratio of amine equivalents to acid halide equivalents in the prepolymer-forming or polymer-forming reaction mixture is in the desired range, whereby the final membrane composition consists of a high molecular weight, crosslinked, insoluble polymer.

The higher-functionality acid halide (e.g. the triacid halide) should either be volatilizable or essentially soluble in nonpolar solvents such as the aliphatic type (including halogenated aliphatics and cycloaliphatics). The acyl halides need not be gases or liquids at room temperature (20°-25° C.), particularly if they can be melted or dissolved readily or boiled without decomposition under conveniently provided volatilization conditions, since the vapor of compounds such as the polyfunctional aromatic carboxylic acid chlorides, phosphorus oxychloride, and cyanuric chloride (2,4,6-trichloro-1,3,5-triazine) is highly reactive with secondary amine solutions when such solutions are brought into contact with the acid chloride vapor. (Cyanuric chloride can be considered to be the acid chloride of cyanuric acid, $C_3N_3[OH]_3$.) Finite, measurable solubility in readily available solvents such as the $C_5$-$C_8$ alkanes and the $C_1$-$C_3$ halogenated aliphatics is particularly desirable, though the solutions can be very dilute (down to 0.1% or even 0.01% by weight) and total miscibility or even high solubility is not required. The acid halide should be selected so that the acid halide functional groups (e.g. —COCl) will react rapidly with secondary amines at temperatures below 100° C., preferably below 30° C. or even 25° C., the amide-forming reaction going substantially to completion in a very short time (e.g. less than a minute) under these conditions. It is also preferred that the acid halide dissolved in nonpolar solvent react readily at concentrations of 0.01 to 10 wt.-%, particularly when the concentration of the secondary amine in the aqueous medium of the interfacial reaction system is in a similar range. Thus, the acid halide should be selected with a view toward these solubility criteria and for suitability in interfacial reaction systems, wherein the secondary amine is in the aqueous phase and the acid halide is in the nonpolar phase or a vapor phase. Mixtures of triacyl halides may be used. Aromatic acyl halides may be mononuclear or polynuclear (e.g. up to three aromatic rings), but mononuclear compounds are preferred. Higher acyl halide functionality may be achieved by synthesizing partial adducts of triacyl halides with difunctional reactants such as ethylene glycol. Such adducts would fall within the scope of this invention so long as they meet the aforementioned criteria.

The diacid halide which may be used in conjunction with the triacyl halide may be taken from a list of compounds including but not limited to oxyalyl chloride, succinoyl chloride, glutaryl chloride, adipoyl chloride, fumaryl chloride, itaconyl chloride, 1,2-cyclobutanedicarboxylic acid chloride, orthophthaloyl chloride, meta-phthaloyl chloride, terephthaloyl chloride, 2,6-pyridinediacarbonyl chloride, p,p'-biphenyl dicarboxylic acid chloride, naphthaline-1,4-dicarboxylic acid chloride, napthalene-2,6-dicarboxylic acid chloride. In virtually all cases, it is desirable that the diacid halide meet the same criteria as the triacid halides described previously. Preferred diacyl halides in this invention are mononuclear aromatic halides, particularly as exemplified by meta-phthaloyl chloride and terephthaloyl chloride.

In one specific preferred embodiment of this invention, piperazine is employed in the form of an aqueous solution, with the concentration of piperazine being about 0.1 to 10% by weight, preferably about 0.5 to 3%. Although the piperazine is, of course, itself an acid acceptor, the solution may also contain additional acid acceptors, such as sodium hydroxide, trisodium phosphate, N,N'-dimethylpiperazine or the like to facilitate the polymerization reaction. The presence of amounts of these is, however, generally not critical. Application of the piperazine solution to the porous support is readily accomplished by any conventional means such as casting the solution on the support, dipping or immersing the support in the solution, or spraying the solution on the support. Generally, application of the piperazine solution to the support is most conveniently and efficiently accomplished by simply placing the support in the solution for a time sufficient to permit complete saturation of the support with the piperazine solution. Removal of excess piperazine solution is readily accomplished by conventional means such as rolling or pressing at pressures sufficient to remove excess solution without damaging the support.

Reaction with the acid chloride, e.g. trimesoyl chloride or a combination of trimesoyl chloride and isophthaloyl chloride, is conducted under conventional conditions for interfacial reaction between the piperazine and the acid chloride. The acid chloride is preferably employed in the nonpolar solvent, the vapor phase contacting approach being ordinarily less preferred. Concentration of the acid chloride in the solvent will generally be in the range of about 0.01 to 10% by weight, preferably about 0.1 to 5%, with the weight ratio of acid chloride to piperazine suitably being about 1:10 to 10.1. Generally, room temperature is satisfactory for the reaction, with temperatures of about 10° to 30° C. usually giving good results.

Reaction with the acid chloride is generally most conveniently and efficiently accomplished by simply immersing the porous support coated with aqueous piperazine into the solvent solution of the acid chloride for a time sufficient to form a thin coating of the resulting poly(piperazineamide) on the surface of the porous support. Generally, a reaction time of about 1 second to 60 seconds is sufficient to form a thin coating or film of the polymer possessing the desired salt barrier characteristics. The resulting composite, consisting of the porous support having a thin coating or film of the poly(piperazineamide) on the surface thereof, is then air dried, preferably at a temperature of about 20° to 130° C. for a period of about 1 to 30 minutes, to form the composite membrane of the invention. This membrane has been found to exhibit high rejection for divalent salts, particularly for magnesium sulfate, as well as high flux. Consequently, the membranes are particularly useful for applications such as brackish water desalting, whey concentration, electroplating chemical recovery, softening of hard water for municipal or home use, or for boiler feed water treatment.

Where trimesoyl chloride alone is employed as the acid chloride, the polymerization reaction is believed to proceed primarily as follows:

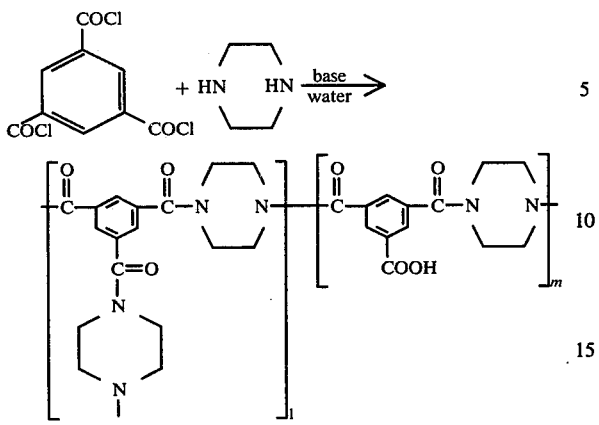

When isophthaloyl chloride is used as a co-reactant, the polymerization reaction is believed to proceed essentially to the following:

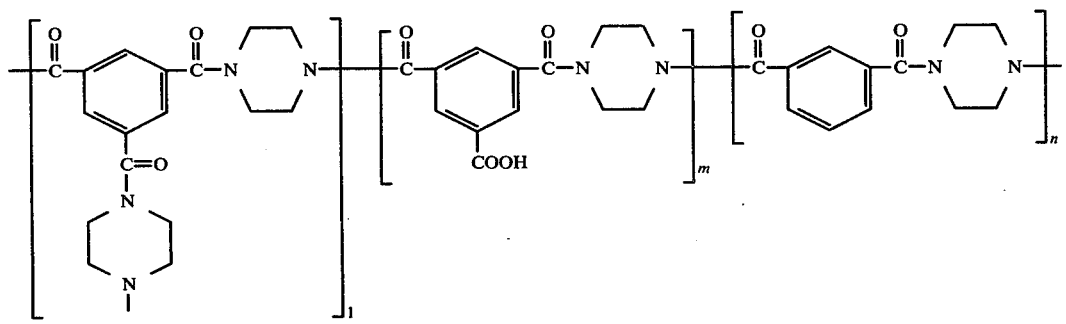

Where a combination of the two acid chlorides is employed, the mole ratio of isophthaloyl chloride to trimesoyl chloride may range up to about 49 to 1, with a ratio of about 2 to 1 generally giving optimum results for maximum water flux, and a ratio of 9 to 1 generally giving an optimum combination of salt rejection and flux.

When a combination of diacyl halide with a triacyl halide is used, a large increase in the flux of the resulting membranes is noted which would not be expected based on the performance of membranes made with either the triacyl halide alone or the diacyl halide alone. Permeate fluxes are observed with these mixed acyl halide membranes which exceed all published values for other membranes that exhibit comparable salt rejection properties towards a salt such as magnesium sulfate dissolved in the aqueous feed. The membranes of this invention also display ion selectivity, in that rejection of multivalent anions is uniformly very effective, while rejection of monovalent anions is dependent upon operating conditions, the ionic strength of the feed water, and the ratio of the diacyl and triacyl halides used in the preparation of the membranes.

The invention will be more specifically illustrated by the following Examples, the first of these Examples being a Control. Parts and percentages are by weight unless otherwise indicated.

EXAMPLE 1 (CONTROL)

This "Control" Example illustrates the performance of a poly(piperazine isophthalamide) membrane, described in U.S. Pat. No. 3,696,031, but prepared according to the art of thin film composite membranes. This Example is used for comparison purposes.

A composite membrane was prepared by saturating a polysulfone support film with a 1 wt.-% aqueous solution of piperazine

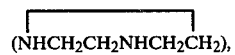

which contained 1% NaOH as an acid acceptor. Excess solution was removed by pressing the film with a soft rubber roller. The saturated support was immersed in a 1 wt.-% solution of isophthaloyl chloride in hexane, at room temperature, for a period of 10 seconds. The drying and testing procedures for the resulting composite membrane were the same as those of Examples 2-6, and the flux and salt rejection data are reported hereinafter in Table 1.

EXAMPLES 2-6

Example 2 illustrates the greatly improved membrane flux performance achieved through employment of trimesoyl chloride and piperazine. Examples 3-6 demonstrate the unexpected, synergistic effect of combining the triacyl halide with a diacyl halide in the preparation of the membranes of this invention.

A series of composite membranes were prepared by the procedure described in Example 1 (the Control). In each case a polysulfone support film was saturated with a 1 wt.-% aqueous solution of piperazine, which also contained an additional acid acceptor as shown in Table 1. Excess solution was removed by pressing the film with a soft rubber roller.

The saturated support was then immersed in a hexane solution of the acid chloride, the type and concentrations of the acid chloride, in weight percent, being given in Table 1, at room temperature for a period of 10 seconds. The support was then removed from the reactant solution, drained and dried in air at a temperature of 25° C. for a period of 30 minutes.

The resulting composite membrane was tested in a reverse osmosis cell for 24 hours, using 0.5% MgSO$_4$ feed solution at 13.6 atmospheres and 25° C. Results are given in Table 1. It will be seen that the membrane prepared from isophthaloyl chloride alone (Example 1) showed good salt rejection but very low flux, while the membrane prepared from trimesoyl chloride alone (Example 2) showed good salt rejection and much improved flux. As is apparent from the data of the Table, however, best results were obtained from a combination of isophthaloyl chloride and trimesoyl chloride in suitable proportions (Examples 3, 4, and 5), resulting in excellent salt rejection as well as greatly improved flux.

TABLE 1

| Example | Ratio of Acyl Halides* | | Flux ($1/m^2d$) | Magnesium Sulfate Salt Rejection (Percent) |
|---|---|---|---|---|
| | Trimesoyl Chloride | Isophthaloyl Chloride | | |
| 1 | 0 | 1 | 155 | 99.2 |
| 2 | 1 | 0 | 1060 | 99.3 |
| 3 | 1.5 | 0.5 | 1260 | 99.9 |
| 4 | 0.33 | 0.67 | 3140 | 99.6 |
| 5 | 0.2 | 0.8 | 2360 | 99.9 |
| 6 | 0.1 | 0.9 | 733 | 99.0 |

*The presence of added acid acceptors varied depending upon acid chlorides used: for example 1, 1% NaOH; for Example 2, 1% N,N-dimethylpiperazine plus 0.2% NaOH; for Examples 3 to 6, 2% $Na_3PO_4 12H_2O$ plus 0.5% sodium dodecyl sulfate.

EXAMPLE 7

This Example illustrates the ion-selective properties of composite membranes of this invention.

A membrane was prepared according to Example 2. This membrane was mounted in a reverse osmosis test cell and exposed sequentially to a series of aqueous salt solutions for a period of 20 to 24 hours per aqueous test solution. Operating conditions were 13.6 atmospheres pressure and 25° C. The flux and salt rejection data for this membrane toward the various solutions, which exhibits selectivity in the rejection of salts containing divalent anions, are shown in Table 2.

TABL 2

| Solutions Used in Reverse Osmosis Test | Reverse Osmosis Test Data | |
|---|---|---|
| | Flux ($1/m^2d$) | Salt Rejection (Percent) |
| 0.1% $MgSO_4$ | 1430 | 98.0 |
| 0.5% NaCl | 1710 | 50 |
| 0.5% $Na_2SO_4$ | 1670 | 97.8 |
| 0.5% $MgCl_2$ | 1300 | 46 |
| 0.5% $MgSO_4$ | 1300 | 97.9 |

EXAMPLES 8–11

These Examples illustrate the utility of this membrane invention in the treatment of various water sources.

EXAMPLE 8

A membrane was prepared according to Example 6, and was mounted in a reverse osmosis test cell. Tests were run with a 3.5% synthetic seawater feed (made with a synthetic sea salt from Lake Products Co., St. Louis, Missouri) and with a synthetic brackish feed of the following composition:
$CaCl_2.2H_2O$: 5.3 g/l
$MgSo_4.7H_O$: 8.6 g/l
NaCl: 10.4 g/l
$Na_2SO_4$: 10.0 g/l
$Na_2CO_3$: 0.2 g/l
total dissolved solids 0.288%.

This membrane exhibited 94.5% salt rejection and 1030 $1/m^2d$ at 68 atmospheres when tested toward synthetic seawater at 25° C. Toward synthetic brackish water at 40.8 atmospheres and 25° C., this membrane exhibited 94.6% salt rejection and 1340 $1/m^2d$ flux.

EXAMPLE 9

A membrane prepared according to Example 2 was tested for water softening application using a tap water characteristic of "hard" water containing magnesium and calcium salts, said water having a conductivity of $0.53 \times 10^{-3}$ mho. The membrane produced 900 $1/m^2d$ and 86% conductivity rejection at 13.6 atmospheres and 25° C., producing a "soft" water suitable for household use.

EXAMPLE 10

A membrane was prepared according to Example 4 and was tested for water softening applications using a "hard" tap water as described in Example 9. This membrane exhibited 2360 $1/m^2d$ and 95.0% conductivity rejection at 13.6 atmospheres and 25° C., producing a "soft" water suitable for household use.

EXAMPLE 11

A membrane was prepared according to Example 2. This membrane when tested under reverse osmosis conditions with 0.1% magnesium sulfate at 13.6 atmospheres and 25° C. exhibited 1300 $1/m^2d$ flux at 98% salt rejection. This membrane was immersed in 100 ppm aqueous chlorine as sodium hypochlorite for 72 hours and then was retested to determine its stability toward chlorine attack. It exhibited a flux of 1380 $1/m^2$ d at 97.4% salt rejection under the same conditions as before. This Example illustrates the chlorine resistance of this type of membrane.

EXAMPLES 12–15

Use of Amine-Terminated Polyamide Prepolymer Intermediates

EXAMPLE 12

An amine-terminated prepolymer of piperazine with trimesoyl chloride was prepared as follows. A solution of 2 grams (23 milliequivalents) of trimesoyl chloride in 100 milliliters of 1,2-dichloroethane was added over a 5 minute period with rapid stirring of a solution of 2 grams of piperazine (47 meq) and 2 grams triethylamine, present as acid acceptor for neutralization, in 100 ml dichloroethane. (The NRH/COCl ratio was 2.04:1.) The prepolymer precipitated from the dichloroethane during the reaction. The propolymer was filtered off, washed with dichloroethane, and air dried to yield approximately 4 grams of product. The prepolymer was mixed with 100 milliliters of water and stirred for one hour at 60° C. This solution was filtered to remove insoluble and gelatinous residues from the prepolymer. Two grams of sodium hydroxide were added to the clear filtrate. A microporous polysulfone support was coated with this solution, pressed with a rubber roller to remove excess solution, then exposed to a 0.1% solution of isophthaloyl chloride in hexane for 10 seconds, and finally air dried at room temperature. This membrane when tested against 3.5% synthetic seawater at 68 atmospheres and 25° C. exhibited 430 $1/m^2d$ at 99.0% salt rejection. Although higher flux (e.g. 600 $1/m^2d$) would be greatly preferred, flux was greatly superior to some prior art membranes, and a salt rejection capability above 98% is considered a significant achievement in this art.

EXAMPLE 13

A solution of 2 grams (23 meq) of trimesoyl chloride in dichloroethane was added over 15 minutes with rapid stirring to a solution of 1.5 grams (35 meq) piperazine and 0.5 grams (6 meq) morpholine in 150 milliliters of dichloroethane. (—NRH/COCl ratio=1.78:1, including —NRH contributed by morpholine.) The resulting suspension of prepolymer in dichloroethane was stirred for 30 minutes, followed by filtrations, washing, and air drying of the prepolymer to yield approximately 4 grams of product. The prepolymer was dissolved in 100 milliliters of water and filtered to remove a small amount of gelatinous material. Two grams of N,N'-dimethylpiperazine acid acceptor was added to the solution. A microporous polysulfone substrate was coated with the solution, pressed with a rubber roller to remove excess solution, exposed to a 0.1% solution of isophthaloyl chloride in hexane for 10 seconds, then dried at 130° C. in a circulating air oven for 15 minutes. Tested against synthetic seawater at 68 atmospheres and 25° C., this membrane exhibited 1750 l/m²d at 93.5% salt rejection.

EXAMPLE 14

A dichloroethane solution of 2.0 grams (33 meq) cyanuric chloride was added with rapid stirring to a solution of 2.8 grams (65 meq) piperazine. The prepolymer was filtered, washed, and dried. (—NRH/COCl ratio=1.97:1.) When mixed with water this prepolymer contained much water insoluble material which was filtered off. The clear filtrate was neutralized with sodium hydroxide, followed by addition of 0.5 gram more sodium hydroxide. The solution was again filtered, providing 50 ml of clear filtrate. A membrane was prepared by interfacial reaction of the amine prepolymer with isophthaloyl chloride as described in Example 13, then dried at 130° C. in an oven. The resulting membrane exhibited 570 l/m²d at 99.2% salt rejection when tested against synthetic seawater at 68 atmospheres and 25° C.

EXAMPLE 15

A solution of 2.0 grams (39 meq) phosphorus oxychloride in 100 milliliters of dichloroethane was added to a solution of 2.2 grams (51 meq) of piperazine in 100 milliliters of dichloroethane with rapid stirring. (—NRH/acid halide ratio=1.31:1.) The prepolymer precipitate was recovered and air dried. This prepolymer was completely soluble when dissolved in 100 milliliters of water containing 1.0 gram of sodium hydroxide. An interfacial membrane was formed on microporous polysulfone as described in Example 13, then air dried. When tested against synthetic seawater at 68 atmospheres and 25° C., this membrane exhibited 1830 l/m²d at 93.9% salt rejection.

EXAMPLE 16

A membrane was prepared according to Example 4 except that 2,6-pyridinedicarboxylic acid chloride was used in place of isophthaloyl chloride. When tested against 0.5% aqueous magnesium sulfate solution at 13.6 atmospheres and 25° C., this membrane exhibited 1210 l/m²d at 95% salt rejection.

EXAMPLE 17

A wet polysulfone substrate was saturated with an aqueous solution containing 2% piperazine and 2% morpholine by weight. This coated support was pressed with a rubber roller, exposed to a solution of 1% trimesoyl chloride in hexane for 10 seconds, then dried at 130° C. When tested against synthetic seawater at 68 atmospheres, this membrane demonstrated 860 l/m²d at 86% salt rejection.

EXAMPLE 18

According to the method of Example 17, but using an aqueous solution of 1% piperazine and 5% diethanolamine, a membrane was prepared which exhibited 1550 l/m²d at 70% salt rejection toward synthetic seawater at 68 atmospheres.

What is claimed is:

1. A process for preparation of a composite reverse osmosis membrane comprising the steps of:
   (a) coating a porous support with a layer comprising an aqueous solution containing, dissolved therein, an essentially monomeric, polyfunctional, essentially water-soluble secondary amine;
   (b) contacting the said layer with an relatively water-insoluble, essentially monomeric, volatilizable polyfunctional acid halide component having an average acid halide functionality greater than 2.05, for a time sufficient to effect in-situ chain extension and crosslinking reactions between the secondary amine and the polyfunctional acid halide; and
   (c) drying the product of step (b) to form the composite reverse osmosis membrane.

2. The process of claim 1 in which the porous support comprises a polysulfone film.

3. The process of claim 1 in which said secondary amine is selected from the group consisting of piperazine and substituted piperazine.

4. The process of claim 1 in which the acyl halide comprises trimesoyl chloride.

5. The process of claim 1 in which the acyl halide comprises a mixture of trimesoyl chloride and isophthaloyl chloride.

6. A composite reverse osmosis membrane prepared by the process of claim 1.

7. A process for preparation of a composite reverse osmosis membrane comprising the steps of:
   (a) coating a porous support with a layer of an aqueous medium containing, dissolved therein, an essentially water-soluble polyamide prepolymer terminated with secondary amine functional groups, the secondary amine functionality of said prepolymer being greater than 2.0;
   (b) contacting the said layer with a polyfunctional acid halide for a time sufficient to effect in-situ chain extension and crosslinking reactions between the polyamide prepolymer and the polyfunctional acid halide; and
   (c) drying the product of step (b) to form the composite reverse osmosis membrane.

8. The process of claim 7 wherein the amine-terminated polyamide prepolymer comprises the reaction product of the reaction mixture comprising piperazine and trimesoyl chloride, and wherein the ratio of equivalents of secondary amine to equivalents of carboxylic acid chloride in said reaction mixture is greater than 1:1.

9. The process of claim 1 in which the polyfunctional halide of step (b) comprises isophthaloyl chloride.

10. A process according to claim 7 wherein said layer of step (a) is contacted with a solution comprising the polyfunctional acid chloride dissolved in a nonpolar organic liquid solvent, and said reactions of said step (b) occur at the interface between said layer and said solution.

11. A process according to claim 10 wherein said organic liquid solvent comprises a liquid alkane.

12. A process according to claim 7 comprising the steps of:

(a) reacting an excess over stoichiometry of an essentially water soluble, polyfunctional secondary amine component with a polyfunctional acid halide component in a nonpolar liquid organic reaction medium, said polyfunctional acid halide having an average acid halide functionality above 2.05, thereby obtaining an essentially water-soluble, secondary-amine terminated polyamide prepolymer;

(b) isolating said prepolymer from said nonpolar liquid organic reaction medium and dissolving the thus-isolated prepolymer in an aqueous medium to obtain an aqueous solution containing said prepolymer;

(c) coating a layer, comprising said aqueous solution, onto a porous support;

(d) contacting said layer with a polyfunctional acid halide to obtain a crosslinked, interfacially polymerized, water insoluble polyamide on said porous support; and (e) drying the product of step (d).

13. A composite reverse osmosis membrane prepared by the process of claim 7.

14. In a process for desalination of saline water by reverse osmosis comprising contacting the saline water under pressure with a reverse osmosis membrane, the improvement comprising using the membrane of claim 6 as the reverse osmosis membrane.

15. The process of claim 14 wherein the saline water contains at least about 3,000 parts per million by weight of an alkaline earth metal salt or a sulfate salt.

16. In a process for desalination of saline water by reverse osmosis comprising contacting the saline water under pressure with a reverse osmosis membrane, the improvement comprising using the membrane of claim 13 as the reverse osmosis membrane.

17. The process of claim 16 wherein the saline water contains at least about 3,000 parts per million by weight of an inorganic chloride salt.

* * * * *

UNITED STATES PATENT AND TRADEMARK OFFICE
CERTIFICATE OF CORRECTION

PATENT NO. : 4,259,183
DATED : March 31, 1981
INVENTOR(S) : John E. Cadotte

It is certified that error appears in the above-identified patent and that said Letters Patent are hereby corrected as shown below:

Insert the following after the Abstract:
     --Research relating to this invention was conducted for the United States Department of the Interior, Office of Water Research and Technology (OWRT), under Contract No. 14-34-001-6521.--
Column 4, line 36, for "teriphthaloyl" read -- terephthaloyl--.
Column 4, line 52, for "polyamide is" read --polyamide) is--.
Column 7, line 60, for "pyridinediacarbonyl" read --pyridinedicarbonyl--.
Column 11, line 31, for "TABL 2" read --TABLE 2--.
Column 11, line 55, for "MgSo$_4$·7H$_o$" read --MgSO$_4$·7H$_2$O--.
Column 12, line 43, for "propolymer" read --prepolymer--.

Signed and Sealed this

Twenty-eighth Day of July 1981

[SEAL]

Attest:

GERALD J. MOSSINGHOFF

Attesting Officer    Commissioner of Patents and Trademarks

UNITED STATES PATENT AND TRADEMARK OFFICE
CERTIFICATE OF CORRECTION

PATENT NO. : 4,259,183

DATED : March 31, 1981

INVENTOR(S) : John E. Cadotte

It is certified that error appears in the above-identified patent and that said Letters Patent is hereby corrected as shown below:

On the title page, Item (73) Assignee should read

-- The United States of America, as represented by the Secretary of the Interior, Washington, D. C. --

Signed and Sealed this

Twentieth Day of July 1982

[SEAL]

Attest:

GERALD J. MOSSINGHOFF

Attesting Officer

Commissioner of Patents and Trademarks